(12) United States Patent
Yang et al.

(10) Patent No.: US 12,136,980 B2
(45) Date of Patent: Nov. 5, 2024

(54) SIGNAL TRANSMISSION METHOD AND DEVICE

(71) Applicant: DATANG MOBILE COMMUNICATIONS EQUIPMENT CO., LTD., Beijing (CN)

(72) Inventors: Meiying Yang, Beijing (CN); Jiaqing Wang, Beijing (CN); Chen Luo, Beijing (CN); Shaohui Sun, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 2 days.

(21) Appl. No.: 17/797,533

(22) PCT Filed: Jan. 7, 2021

(86) PCT No.: PCT/CN2021/070731
§ 371 (c)(1),
(2) Date: Aug. 4, 2022

(87) PCT Pub. No.: WO2021/155732
PCT Pub. Date: Aug. 12, 2021

(65) Prior Publication Data
US 2023/0056906 A1    Feb. 23, 2023

(30) Foreign Application Priority Data
Feb. 7, 2020   (CN) .......................... 202010082660.4

(51) Int. Cl.
*H04B 1/38*      (2015.01)
*H04B 7/06*      (2006.01)
*H04L 5/16*      (2006.01)
*H04W 52/02*     (2009.01)
(Continued)

(52) U.S. Cl.
CPC ...... *H04B 7/0639* (2013.01); *H04W 52/0248* (2013.01); *H04W 68/005* (2013.01); *H04W 76/28* (2018.02)

(58) Field of Classification Search
CPC ................ H04B 7/0639; H04W 76/28; H04W 52/0248; H04W 68/005; H04W 52/0235
USPC ................................. 375/219, 220, 259, 354
See application file for complete search history.

(56) References Cited

U.S. PATENT DOCUMENTS

2019/0103950 A1   4/2019   Liu et al.
2019/0166556 A1   5/2019   Ly et al.
(Continued)

FOREIGN PATENT DOCUMENTS

CN   107079404 A   8/2017
CN   109155973 A   1/2019
(Continued)

OTHER PUBLICATIONS

Mediatek Inc., "NR RRM UE power saving" 3GPP TSG RAN WG1 Meeting RAN1 #96, R1-1903354, Mar. 1, 2019, 11 pages.

*Primary Examiner* — Phuong Phu
(74) *Attorney, Agent, or Firm* — Meunier Carlin & Curfman LLC

(57) ABSTRACT

Disclosed are a signal transmission method and device. In the present application, the method includes: a base station configuring sending resources for at least two of a first signal, a second signal and a third signal, and sending the at least two signals according to the sending resources for the at least two signals, wherein in the at least two signals, the transceiving of one signal is indicated by at least one of the other signals; the first signal is a signal for at least one of the functions of synchronization, wave beam measurement, wave beam acquisition and RRM; the second signal is a signal for at least one of the functions of synchronization, (Continued)

A base station configures sending resources of at least two of a first signal, a second signal and a third signal, wherein transceiving of one of the at least two signals is indicated by at least one of other signals; wherein the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging — S201

The base station sends the at least two signals according to the sending resources of the at least two signals — S202 fine synchronization, wave beam measurement, wave beam acquisition, RRM, CSI measurement and terminal wakeup; and the third signal is a signal for paging.

19 Claims, 6 Drawing Sheets

(51) Int. Cl.
*H04W 68/00* (2009.01)
*H04W 76/28* (2018.01)

(56) References Cited

U.S. PATENT DOCUMENTS

| | | |
|---|---|---|
| 2020/0107341 A1 | 4/2020 | Zhang et al. |
| 2020/0163124 A1 | 5/2020 | Da et al. |
| 2021/0007051 A1 | 1/2021 | Tang |
| 2021/0160779 A1 | 5/2021 | Liu |
| 2021/0235381 A1 | 7/2021 | Yang et al. |
| 2021/0297987 A1* | 9/2021 | Hwang ............. H04W 52/0235 |

FOREIGN PATENT DOCUMENTS

| | | |
|---|---|---|
| CN | 109392143 A | 2/2019 |
| CN | 110224802 A | 9/2019 |
| CN | 110557812 A | 12/2019 |
| TW | 201943301 A | 11/2019 |
| WO | 2018202751 A1 | 11/2018 |
| WO | 2019033916 A1 | 2/2019 |
| WO | 2019216808 A1 | 11/2019 |
| WO | 2019233175 A1 | 12/2019 |

* cited by examiner

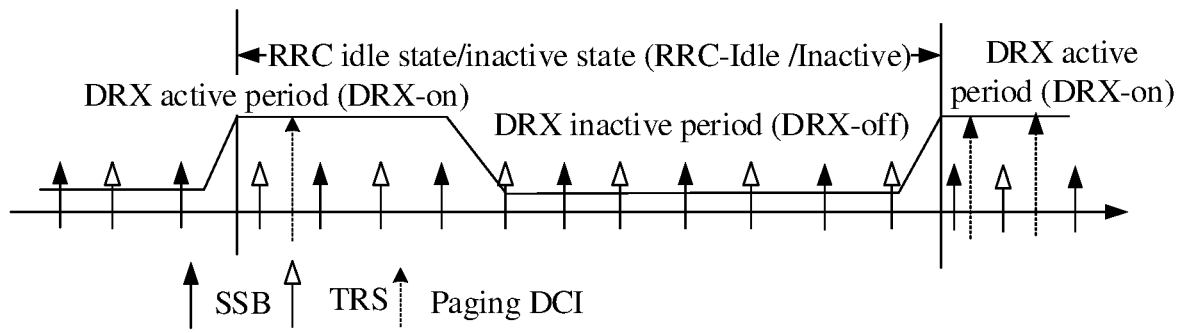

Fig. 1

```
A base station configures sending resources of at least two of a first
 signal, a second signal and a third signal, wherein transceiving of
 one of the at least two signals is indicated by at least one of other     S201
    signals; wherein the first signal is a signal for at least one of
 synchronization, beam measurement, beam acquisition or RRM
    measurement; the second signal is a signal for at least one of
 synchronization, fine synchronization, beam measurement, beam
  acquisition, RRM measurement, CSI measurement or terminal
       wakeup; and the third signal is a signal for paging
```

```
 The base station sends the at least two signals according to the     S202
       sending resources of the at least two signals
```

Fig. 2

A terminal receives sending resources of at least two of a first signal, a second signal and a third signal configured by a base station, wherein transceiving of one of the at least two signals is indicated by at least one of other signals; wherein the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging ⟶ S301

The terminal receives the at least two signals according to the sending resources of the at least two signals ⟶ S302

Fig. 3

SIGNAL TRANSMISSION METHOD AND DEVICE

CROSS-REFERENCE OF RELATED APPLICATIONS

The present application is a National Stage of International Application No. PCT/CN2021/070731 filed Jan. 7, 2021, which claims the priority from Chinese Patent Application No. 202010082660.4, filed with the Chinese Patent Office on Feb. 7, 2020 and entitled "Signal Transmission Method and Device", which is hereby incorporated by reference in its entirety.

FIELD OF INVENTION

The present application relates to the field of wireless communication technologies, and in particular to a signal transmission method and device.

BACKGROUND

The network side needs to send a variety of signals to a terminal to implement different functions. For example, these signals may include Tracking Reference Signal (TRS)/Channel State Indicator-Reference Signal (CSI-RS), Synchronization Signal Block (SSB), paging signal (Paging), etc.

Here, the TRS may be used for time-frequency tracking; the CSI-RS may be used for channel quality acquisition, Reference Signal Received Power (RSRP) channel measurement, mobility measurement, etc.; the TRS/CSI-RS may also be used as an energy saving signal, which indicates whether the terminal wakes up to receive the Downlink Control Information (DCI). The SSB may be used to implement the synchronization operation, or to perform the Radio Resource Management (RRM) measurement or mobility measurement. The paging signal (Paging) may wake up the terminal to monitor signals.

The above-mentioned signals may be sent periodically, and usually have different sending periods. How to indicate the transceiving relationship among the above-mentioned signals to reduce the power consumption of the terminal is a problem that needs to be solved at present.

SUMMARY

Embodiments of the present application provide a signal transmission method and device.

In a first aspect, a signal transmission method is provided, including: a base station configuring sending resources of at least two of a first signal, a second signal and a third signal, and sending the at least two signals according to the sending resources of the at least two signals, wherein transceiving of one of the at least two signals is indicated by at least one of other signals; the first signal is a signal for at least one of synchronization, beam measurement, beam acquisition or RRM measurement; the second signal is a signal for at least one of synchronization, fine synchronization, beam measurement, beam acquisition, RRM measurement, Channel State Indicator (CSI) measurement or terminal wakeup; and the third signal is a signal for paging.

In a second aspect, a signal transmission method is provided, including: a terminal receiving sending resources of at least two of a first signal, a second signal and a third signal configured by a base station, and receiving the at least two signals according to the sending resources of the at least two signals, wherein transceiving of one of the at least two signals is indicated by at least one of other signals; the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging.

In a third aspect, a base station is provided, including: a processor, a memory and a transceiver;

the transceiver is configured to receive and send data under control of the processor;

the memory is configured to store computer instructions;

the processor is configured to read the computer instructions and execute the signal transmission method provided in the first aspect.

In a fourth aspect, a terminal is provided, including: a processor, a memory and a transceiver;

the transceiver is configured to receive and send data under control of the processor;

the memory is configured to store computer instructions;

the processor is configured to read the computer instructions and execute the signal transmission method provided in the second aspect.

In a fifth aspect, a base station is provided, including: a processing module configured to configure sending resources of at least two of a first signal, a second signal and a third signal, wherein transceiving of one of the at least two signals is indicated by at least one of other signals; the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging; and a sending module configured to send the at least two signals according to the sending resources of the at least two signals.

In a sixth aspect, a terminal is provided, including: a receiving module configured to receive sending resources of at least two of a first signal, a second signal and a third signal configured by a base station, wherein transceiving of one of the at least two signals is indicated by at least one of other signals; the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging; and receive the at least two signals according to the sending resources of the at least two signals.

In a seventh aspect, a computer readable storage medium is provided, where the computer readable storage medium stores computer executable instructions which are configured to cause a computer to perform the signal transmission method described in the first aspect.

In an eighth aspect, a computer readable storage medium is provided, where the computer readable storage medium stores computer executable instructions which are configured to cause a computer to perform the signal transmission method described in the second aspect.

In the above embodiments of the present application, the base station configures sending resources of at least two of the first signal, the second signal and the third signal, and sends the at least two signals according to the sending resources of the at least two signals, wherein the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging. Since in the above three signals, transceiving of one of the at least two signals is indicated by at least one of other signals, the terminal can know the configuration related to transceiving of the other signal through one or two of the above three signals, thereby further reduce the power consumption of the terminal.

BRIEF DESCRIPTION OF THE DRAWINGS

In order to illustrate the technical solutions in the embodiments of the present application more clearly, the accompanying figures which need to be used in the embodiments of the present application will be introduced below briefly. Obviously the accompanying figures introduced below are only some embodiments of the present application, and other accompanying figures can also be obtained by those ordinary skilled in the art according to these accompanying figures without creative labor.

FIG. 1 exemplarily shows a schematic diagram of the processing flow of SSB, TRS and paging signal.

FIG. 2 exemplarily shows a schematic diagram of a signal sending process on a base station side provided by an embodiment of the present application.

FIG. 3 exemplarily shows a schematic diagram of a signal receiving process on a terminal side provided by an embodiment of the present application.

DETAILED DESCRIPTION OF THE EMBODIMENTS

Figure 4:
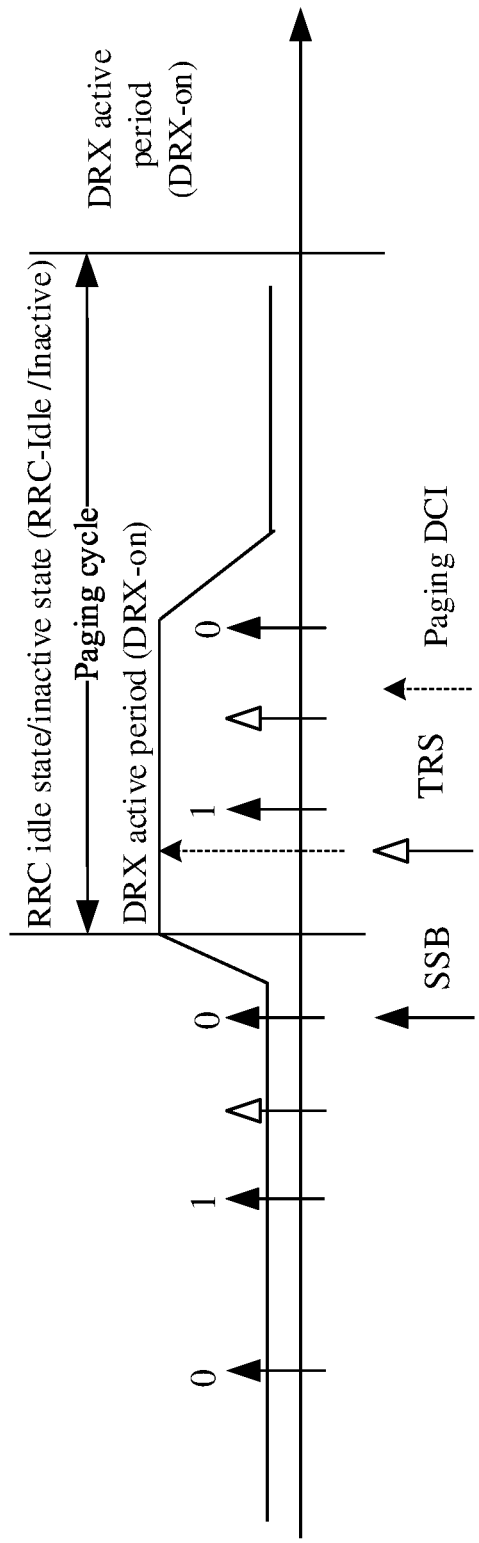
FIG. 4, FIG. 5 and FIG. 6 respectively show schematic diagrams of processing flows of SSB, TRS, and paging signal in the embodiments of the present application.

In order to make the objects, technical solutions and advantages of the present application clearer, the present application will be further illustrated below in details with reference to the accompanying figures. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

In the following, some terms in the embodiments of the present application are explained so as to facilitate the understanding of those skilled in the art.

(1) In the embodiments of the present application, the nouns "network" and "system" are often used alternately, but those skilled in the art may understand the meaning thereof.

(2) The term "a plurality of" in the embodiments of the present application refers to two or more, and other quantifiers are similar thereto.

(3) "and/or" describes the association relationship of the associated objects, and indicates that there may be three relationships, for example, A and/or B may represent: only A, both A and B, and only B. The character "/" generally indicates that the associated objects have a kind of "or" relationship.

(4) Network side device is a device that provides the wireless communication function for the terminal, including but not limited to: gNB in 5G, Radio Network Controller (RNC), Node B (NB), Base Station Controller (BSC), Base Transceiver Station (BTS), home base station (for example, home evolved NodeB or Home Node B (HNB)), Base Band Unit (BBU), Transmission and Reception Point (TRP), Transmitting Point (TP), mobile switching center, etc. The base station in the present application may also be a device that provides the wireless communication function for the terminal in other communication systems that may appear in the future. The embodiments of the present application are described by taking "base station" as an example.

(5) Terminal is a device that can provide users with voice and/or data connectivity. For example, the terminal device includes a handheld device with wireless connection function, a vehicle-mounted device, etc. At present, the terminal device may be: mobile phone, tablet, laptop, palmtop computer, Mobile Internet Device (MID), wearable device, Virtual Reality (VR) device, Augmented Reality (AR) device, wireless terminal in the industrial control, wireless terminal in the self driving, wireless terminal in the smart grid, wireless terminal in the transportation safety, wireless terminal in the smart city, or wireless terminal in the smart home, etc.

The base station needs to send various signals to the terminal to realize different functions. For example, these signals may include TRS/CSI-RS, SSB, paging signal (Paging), etc.

The TRS/CSI-RS is currently defined in the NR R16 standard, wherein the TRS may be used for time-frequency tracking, and the CSI-RS may be used for channel quality acquisition, RSRP channel measurement, mobility measurement, etc. Further, the TRS/CSI-RS may also be used as an energy saving signal, which indicates whether the terminal wakes up to receive the DCI, so that the power consumption of the terminal in the Radio Resource Control (RRC) idle state (RRC-idle) can be reduced.

At present, there are three sending modes of TRS/CSI-RS based on the RRC-connected state (RRC-connected) defined in the NR R16 standard.

Mode 1: periodic sending. The sending resources of the TRS/CSI-RS are configured by RRC signaling, including time-frequency spatial domain resources, reporting content, etc. When the configured period arrives, the TRS/CSI-RS is sent on the configured resources.

Mode 2: semi-persistent scheduled sending. The sending resources and the reporting type of the TRS/CSI-RS are configured by RRC signaling, and the sending of the TRS/CSI-RS is triggered by dynamic signaling; when the TRS/CSI-RS does not need to be sent, the TRS/CSI-RS is deactivated by dynamic signaling.

Mode 3: aperiodic sending. When the TRS/CSI-RS is required, the sending of the TRS/CSI-RS is triggered by L1 (Layer 1) dynamic signaling, wherein the sending of the TRS/CSI-RS may be at the DRX-on (DRX active period, wherein DRX is the abbreviation of Discontinuous Reception, indicating non-continuous reception) moment and DRX-Off (DRX inactive period) moment. The L1 dynamic signaling may be DCI format 0-1, and a CSI request bit field in the DCI is used to trigger the sending of the TRS/CSI-RS.

For the periodic sending of the TRS/CSI-RS, the terminal can monitor in the RRC idle state, RRC inactive state (RRC-Inactive) and RRC connected state; for the semi-persistent scheduled sending of the TRS/CSI-RS, the terminal can monitor in the RRC connected state; for the dynamic sending (aperiodic sending) of the TRS/CSI-RS, the terminal can monitor in the RRC connected state.

The SSB is configured periodically, and the terminal can perform SSB monitoring and synchronization operation, or perform the RRM measurement or mobility measurement, etc. when the SSB cycle arrives.

The paging signal (Paging) is configured periodically, and the terminal can determine its Paging Occasion (PO) moment through a Paging Frame (PF) and a PO and monitor the paging signal at the PO moment. At the PO moment, the terminal needs to wake up and monitor regardless of whether there is a paging signal for itself or not.

Taking the above three signals as an example, the operation flow on the terminal side may be as shown in FIG. 1. As shown, the terminal periodically monitors the SSB for synchronization and/or RRM measurement; the terminal periodically monitors the TRS for precise channel time-frequency synchronization; the terminal periodically monitors the paging signal (Paging), and receives and monitors the Paging DCI at the position PO. In a case that the paging DCI for itself is monitored, the terminal performs the demodulation and decoding of the subsequent PDSCH; in a case that no paging DCI for itself is monitored, the terminal continues to monitor the paging signal in the next paging period.

The period of the SSB may be 5 ms, 10 ms, 20 ms, 40 ms, 80 ms or 160 ms. The period of the TRS/CSI-RS may be 10 ms, 20 ms, 40 ms or 80 ms (15 KHZ as an example), and an offset in the time domain may be configured at the same time, where the value range of the offset is [0 ms, 32 ms]. The period of the paging signal (Paging) may be 32 radio frames, 64 radio frames, 128 radio frames or 256 radio frames, wherein the position of PO may be one or more slots in a PF according to the configuration of the Synchronization Signal (SS), and the starting position of PO depends on the offset configuration of the SS and the offset configuration of the PO.

After receiving the SSB for synchronization, the terminal needs to perform the fine synchronization or time-frequency tracking based on the TRS before PO in a case that the terminal needs to receive the paging signal (Paging). In a case that the sending moment of the TRS/CSR-RS is far from the sending moment of the SSB, the terminal needs to wait for a long period of time to receive the TRS to complete the fine synchronization after receiving the SSB, and then receive the Paging DCI.

From the perspective of energy saving of the terminal, the terminal needs to wake up periodically to receive the SSB, TRS and paging signal (Paging), bringing the greater power consumption. For example, in a case that the time interval between the SSB and TRS is relatively large, the terminal cannot enter deep sleep in order to receive these signals periodically, thereby resulting in the additional power consumption. Further, in a case that the time interval between any two of the SSB, the TRS and the paging signal (Paging) is relatively large, it may cause an error in the demodulation and decoding of the DCI of the paging signal (Paging), thereby causing the unnecessary power consumption.

The embodiments of the present application provide a signal transmission method and device. When the network side needs to send at least two signals to a terminal, the transceiving of one of the signals is indicated by one or more other signals, so that the terminal can know the configuration related to signal transceiving (such as: whether to receive a certain signal, or sending resources of a certain signal), thereby reducing the power consumption of the terminal. The embodiments of the present application may be applied to the signal configuration and transmission in the RRC idle state (RRC-Idle).

The embodiments of the present application will be described below in detail with reference to the drawings.

FIG. 2 exemplarily shows a schematic diagram of a signal sending process implemented on the base station side provided by an embodiment of the present application; and as shown, this process may include the following operations.

S201: a base station configures sending resources of at least two of a first signal, a second signal and a third signal, wherein transceiving of one of the at least two signals is indicated by at least one of other signals.

Wherein, the first signal, the second signal and the third signal are different signals.

The first signal may be a signal for implementing at least one of synchronization, beam measurement, beam acquisition, RRM measurement; or may be a signal for implementing at least one of the following functions: broadcast, system message. The first signal may be at least one of: SSB, Secondary Synchronization Signal (SSS), Primary Synchronization Signal (PSS), Physical Broadcast Channel (PBCH), Remaining System Information (RMSI); and may carry at least one of: synchronization information, broadcast information, system information.

The second signal may be a signal for implementing at least one of synchronization, fine synchronization, beam measurement, beam acquisition, RRM measurement, CSI measurement, terminal wakeup; or may be a signal for implementing at least one of: channel tracking, phase tracking, positioning. The second signal may be at least one of: TRS, CSI-RS, Wake-up signal (WUS), Phase Tracking Reference Signal (PT-RS), Positioning Reference Signal (P-RS). Optionally, the second signal may include at least one of a cell-level signal, a terminal-group-level (UE-group) signal, or a terminal-level (UE-specific) signal.

The third signal may be a signal for paging, such as a paging signal (Paging).

S202: the base station sends the at least two signals according to the sending resources of the at least two signals.

In the above process, the transceiving of one signal is indicated by at least one of the other signals, which means that whether one signal needs to be sent or received can be indicated by one or two of the other signals, or the sending resources of one signal can be indicated by one or two of other signals, or a combination thereof. For example, at least one of the following cases may be included:

(1) The transceiving of the first signal is indicated by at least one of the second signal and the third signal;
(2) The transceiving of the second signal is indicated by at least one of the first signal and the third signal;
(3) The transceiving of the third signal is indicated by at least one of the second signal and the first signal.

FIG. 3 exemplarily shows a schematic diagram of a signal receiving process implemented on the terminal side provided by an embodiment of the present application; and as shown, this process may include the following operations.

S301: a terminal receives sending resources of at least two of a first signal, a second signal and a third signal configured by a base station, wherein transceiving of one of the at least two signals is indicated by at least one of other signals.

Wherein, the related description of the first signal, second signal and third signal is the same as that in the previous embodiments, and will not be repeated here.

S302: the terminal receives the at least two signals according to the sending resources of the at least two signals.

In the above embodiments of the present application, the base station configures sending resources of at least two of the first signal, the second signal and the third signal, and sends the at least two signals according to the sending resources of the at least two signals, wherein the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging. Since transceiving of one of the at least two signals is indicated by at least one of other signals, the terminal can know the configuration related to transceiving of the other signal through one or two of the above three signals, thereby further reduce the power consumption of the terminal.

The solution of indicating the transceiving of one or more signals by one or more other signals in the embodiments of the present application will be illustrated below by several examples.

Implementation 1: The first signal indicates the transceiving of the second signal.

In the Implementation 1, on the base station side, the base station configures at least the sending resources of the first signal and the second signal, and may further configure the sending resources of the third signal, wherein the first signal may be used to indicate the transceiving of the second signal.

Optionally, the first signal may include at least one of first indication information and second indication information, the first indication information is used to indicate whether to send or receive the second signal (for example, the first indication information is used to indicate whether the base station sends the second signal or whether the terminal needs to receive the second signal), and the second indication information is used to indicate sending resources of the second signal.

Optionally, the first indication information may be 1-bit indication information. When a value of the first indication information is 0, the terminal needs to receive the second signal; when the value of the first indication information is 1, the terminal does not need to receive the second signal, and vice versa.

FIG. 4 exemplarily shows a schematic diagram of transmission of the first signal and the second signal. As shown, when the value of the first indication information in the first signal is 0 (such as the first SSB and the third SSB in the figure), no second signal is sent thereafter; when the value of the first indication information in the first signal is 1 (such as the second SSB in the figure), a second signal is sent thereafter.

Optionally, the second indication information is a resource index of the sending resources of the second signal. According to the number of sending resources of the second signal, the number of bits of the second indication information can be defined. For example, in a case that the base station configures 4 sending resources for the second signal, the second indication information can be 2-bit indication information for indicating 4 sending resources.

Wherein, the sending resources of the second signal may include at least one of: sending resources configured by RRC signaling, pre-agreed sending resources, or sending resources associated with sending resources of the first signal.

The above-mentioned sending resources configured by RRC signaling may include: sending resources of the second signal configured in the RRC connected state (RRC-connected), sending resources of the second signal configured in the RRC idle state (RRC-Idle), and sending resources of the second signal configured in the RRC inactive state (RRC-inactive) which are the stored sending resources of the second signal configured in RRC-connected.

The above-mentioned sending resources associated with the sending resources of the first signal may include one or any combination of the following sending resources.

(1) Sending resources with a time interval from the sending resources of the first signal in the time domain being not greater than a set time interval. The set time interval includes at least one time interval unit, and the time interval unit includes at least one of: a radio frame, a half frame, a subframe, a slot, or a symbol. For example, in a case that the set time interval is 2 subframes, the time interval between the sending resources of the second signal and the sending resources of the first signal in the time domain does not exceed 2 subframes, that is, the resources with a time interval from the sending resources of the first signal being within a range of 2 subframes (including 2 subframes) may all be used as the sending resources of the second signal. Specifically, the time interval may be 1 subframe, or the time interval may be 2 subframes, or the following case may be possible: the time interval between some of the sending resources of the second signal and the sending resources of the first signal is 1 subframe, and the time interval between some of the sending resources of the second signal and the sending resources of the first signal is 2 subframes.

Figure 5:
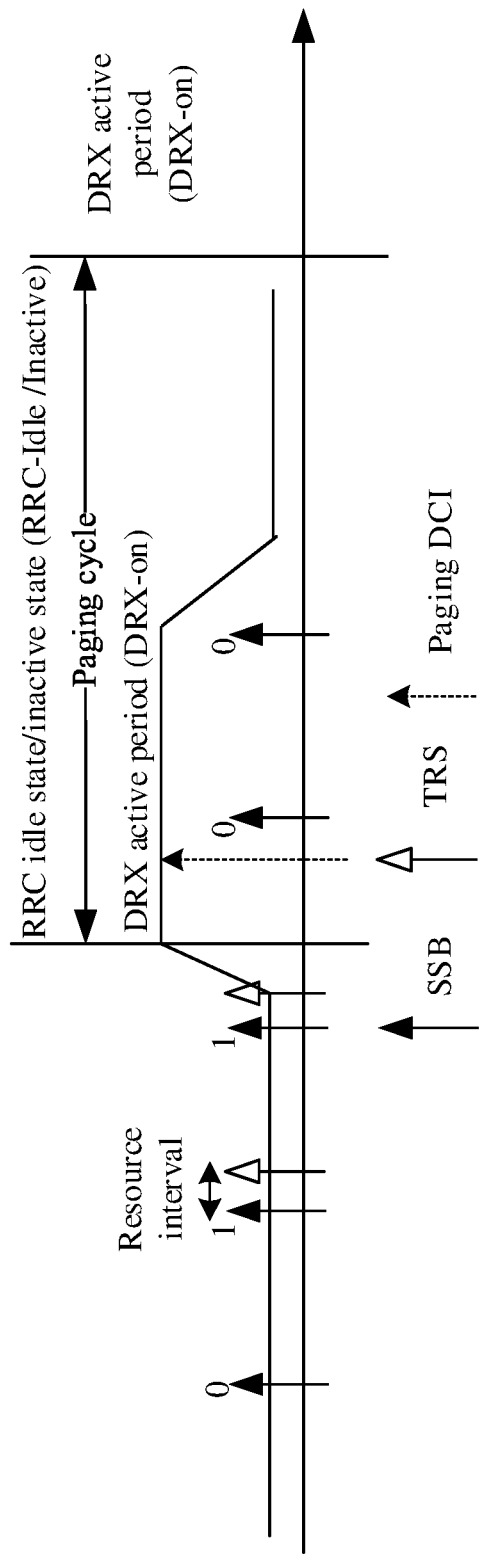

FIG. 5 exemplarily shows a schematic diagram of transmission of the first signal and the second signal. As shown in FIG. 5, in the case where the second signal is configured to be sent (in the case where the values of the first indication information in the second SSB and the third SSB are 1 as shown in FIG. 5), the second signal is sent and the sending moment of the second signal is associated with the sending moment of the first signal, and specifically, there are one or more time interval units between the sending moment of the second signal and the sending moment of the first signal.

Figure 6:
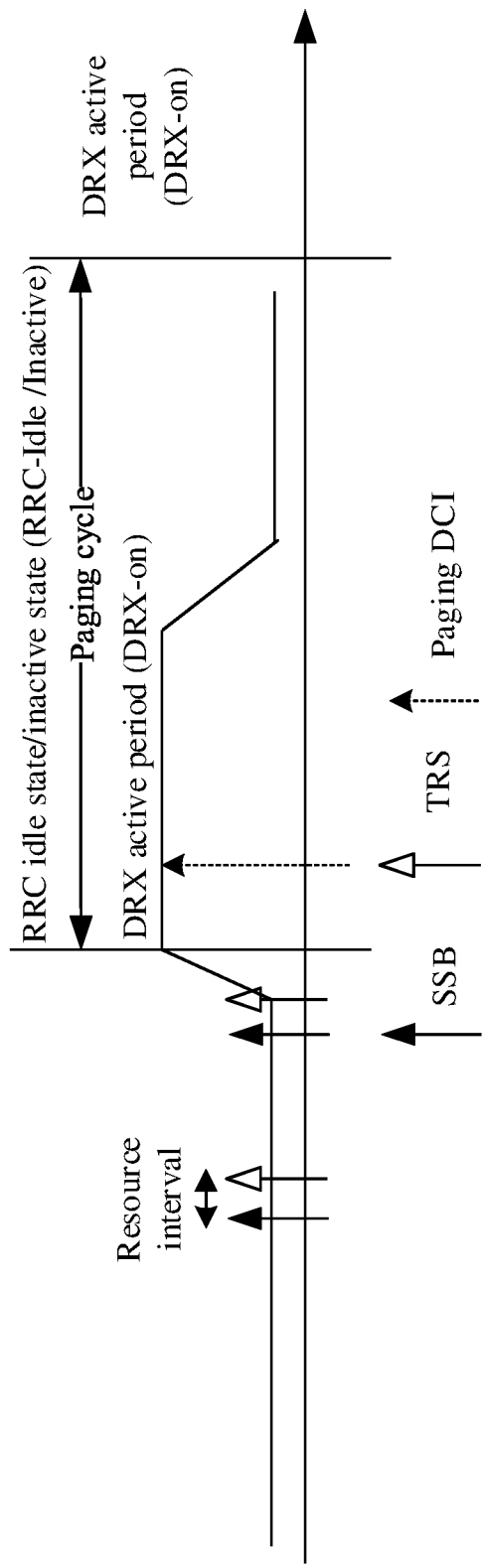

FIG. 6 exemplarily shows a schematic diagram of transmission of the first signal and the second signal. As shown in FIG. 6, in the case where the second signal is configured to be sent (as shown in FIG. 6, each SSB includes the second indication information, and the second indication information instructs the base station to send the second signal), the sending moment of the second signal is associated with the sending moment of the first signal, and specifically, there are one or more time interval units between the sending moment of the second signal and the sending moment of the first signal.

(2) Sending resources with a frequency-domain interval from the sending resources of the first signal in the frequency domain being not greater than a set frequency-domain interval. The set frequency-domain interval includes at least one frequency-domain interval unit, and the frequency-domain interval unit includes at least one of: a carrier, a Resource block (RB), or a Resource element (RE). For example, in a case that the set frequency-domain interval is 4 RBs, the frequency-domain interval between the sending resources of the second signal and the sending resources of the first signal in the frequency domain does not exceed 4 RBs, that is, the resources with a frequency-domain interval from the sending resources of the first signal being within the range of 4 RBs (including the frequency-domain interval of 4 RBs) may all be used as the sending resources of the second signal.

(3) Sending resources with a beam interval from the sending resources of the first signal in a spatial beam direction being not greater than a set spatial domain interval. The set spatial domain interval includes at least one space beam interval unit, and the space beam interval unit includes at least one of a radian or a degree. For example, in a case that the set spatial domain interval is 2 radians, the beam interval between the sending resources of the second signal and the sending resources of the first signal in the space domain does not exceed 2 radians.

(4) Sending resources orthogonal to the sending resources of the first signal in the code domain.

On the terminal side, the terminal receives the sending resources of the first signal and the second signal configured by the base station. In a case that the base station also configures the sending resources of the third signal, the terminal also receives the sending resources of the third signal configured by the base station, and receives the corresponding signals according to the sending resources configured by the base station.

In some embodiments, in a case that the first signal received by the terminal includes the first indication information (and no second indication information) and the terminal determines according to the first indication information that the terminal needs to receive the second signal, the terminal receives the second signal according to the sending resources of the second signal configured by the base station. In a case that the terminal determines according to the first indication information that the terminal does not need to receive the second signal, the terminal does not receive the second signal.

In some other embodiments, in a case that the first signal received by the terminal includes the first indication information and the second indication information and the terminal determines according to the first indication information that the terminal needs to receive the second signal, the terminal receives the second signal according to the sending resources indicated by the second indication information. In a case that the terminal determines according to the first indication information that the terminal does not need to receive the second signal, the terminal does not receive the second signal.

In some other embodiments, in a case that the first signal received by the terminal includes the second indication information (and no first indication information), the terminal determines that the terminal needs to receive the second signal and receives the second signal according to the sending resources indicated by the second indication information.

Implementation 2: The second signal indicates the transceiving of the first signal.

In the Implementation 2, on the base station side, the base station configures at least the sending resources of the first signal and the second signal, and may further configure the sending resources of the third signal, wherein the second signal may be used to indicate the transceiving of the first signal.

Optionally, the second signal includes at least one of third indication information and fourth indication information, the third indication information is used to indicate whether to send or receive the first signal (for example, the third indication information is used to indicate whether the base station sends the first signal or whether the terminal needs to receive the first signal), and the fourth indication information is used to indicate the sending resources of the first signal.

Optionally, the third indication information may be 1-bit indication information. When the value of the third indication information is 0, the terminal needs to receive the first signal; when the value of the third indication information value is 1, the terminal does not need to receive the first signal, and vice versa.

Optionally, the fourth indication information is a resource index of the sending resources of the first signal. According to the number of sending resources of the first signal, the number of bits of the fourth indication information can be defined. For example, in a case that the base station configures 4 sending resources for the first signal, the fourth indication information can be 2-bit information for indicating the 4 sending resources.

The sending resources of the first signal include at least one of: sending resources configured by RRC signaling, pre-agreed sending resources, or sending resources associated with sending resources of the second signal.

The above-mentioned sending resources configured by RRC signaling may include: sending resources of the second signal configured in the RRC connected state (RRC-connected), sending resources of the second signal configured in the RRC idle state (RRC-Idle), and sending resources of the second signal configured in the RRC inactive state (RRC-inactive) which are the stored sending resources of the second signal configured in RRC-connected.

The above-mentioned sending resources associated with the sending resources of the second signal may include one or any combination of the following resources.

(1) Sending resources with a time interval from the sending resources of the second signal in the time domain being not greater than a set time interval. The set time interval includes at least one time interval unit, and the time interval unit includes at least one of: a radio frame, a half frame, a subframe, a slot, or a symbol. For example, in a case that the set time interval is 2 subframes, the time interval between the sending resources of the first signal and the sending resources of the second signal in the time domain does not exceed 2 subframes, that is, the resources with the time intervals from the sending resources of the second signal being within the range of 2 subframes (including 2 subframes) may all be used as the sending resources of the first signal. Specifically, the time interval may be 1 subframe, or the time interval may be 2 subframes, or the following case may be possible: the time interval between some of the sending resources of the first signal and the sending resources of the second signal is 1 subframe, and the time interval between some of the sending resources of the first signal and the sending resources of the second signal is 2 subframes.

(2) Sending resources with a frequency-domain interval from the sending resources of the second signal in the frequency domain being not greater than a set frequency-domain interval. The set frequency-domain interval includes at least one frequency-domain interval unit, and the frequency-domain interval unit includes at least one of: a carrier, an RB, or an RE. For example, in a case that the set frequency-domain interval is 4 RBs, the frequency-domain interval between the sending resources of the first signal and the sending resources of the second signal in the frequency domain does not exceed 4 RBs, that is, the resources with the frequency-domain intervals from the sending resources of the second signal being within the range of 4 RBs (including the frequency-domain interval of 4 RBs) may all be used as the sending resources of the first signal.

(3) Sending resources with a beam interval from the sending resources of the second signal in a spatial beam direction being not greater than a set spatial domain interval. The set spatial domain interval includes at least one space beam interval unit, and the space beam interval unit includes at least one of a radian or a degree. For example, in a case that the set spatial domain interval is 2 radians, the beam interval between the sending resources of the first signal and the sending resources of the second signal in the space domain does not exceed 2 radians.

(4) Sending resources orthogonal to the sending resources of the second signal in the code domain.

On the terminal side, the terminal receives the sending resources of the first signal and the second signal configured by the base station. In a case that the base station also configures the sending resources of the third signal, the terminal also receives the sending resources of the third signal configured by the base station, and receives the corresponding signals according to the sending resources configured by the base station.

In some embodiments, in a case that the second signal received by the terminal includes the third indication information (and no fourth indication information) and the terminal determines according to the third indication information that the terminal needs to receive the first signal, the terminal receives the first signal according to the sending resources of the first signal configured by the base station. In a case that the terminal determines according to the third indication information that the terminal does not need to receive the first signal, the terminal does not receive the first signal.

In some other embodiments, in a case that the second signal received by the terminal includes the third indication information and the fourth indication information and the terminal determines according to the third indication information that the terminal needs to receive the first signal, the terminal receives the first signal according to the sending resources indicated by the fourth indication information. In a case that the terminal determines according to the third indication information that the terminal does not need to receive the first signal, the terminal does not receive the first signal.

In some other embodiments, in a case that the second signal received by the terminal includes the fourth indication information (and no third indication information), the terminal determines that the terminal needs to receive the first signal and receives the first signal according to the sending resources indicated by the fourth indication information.

Implementation 3: The third signal indicates the transceiving of the first signal.

In the Implementation 3, on the base station side, the base station configures the sending resources of the first signal, the second signal and the third signal, wherein the third signal may be used to indicate the transceiving of the first signal.

Optionally, the sending moment of the first signal is indicated by the sending moment of the third signal, wherein the sending moment of the first signal is the same as the sending moment of the third signal, or the sending moment of the first signal is before the sending moment of the third signal and has a set time offset from the sending moment of the third signal.

On the terminal side, the terminal receives the sending resources of the first signal, the second signal and the third signal configured by the base station, and receives the corresponding signals according to the sending resources configured by the base station, wherein the terminal determines the sending moment of the first signal according to the sending moment of the third signal, and receives the first signal according to the sending moment of the first signal.

For example, the base station configures whether to send the third signal at the moment M. In a case that the third signal is sent at the moment M, the base station sends the first signal at the moment (M−k), wherein k is a positive integer not less than zero, so that the transceiving of the first signal is not later than the moment of the PF (Paging Frame) where the third signal is located, or the transceiving of the first signal is not later than the moment of the PO (Paging Occasion) where the third signal is located.

In a case that the base station does not send the third signal, the base station does not configure the sending of the first signal.

Implementation 4: The third signal indicates the transceiving of the second signal.

In the Implementation 4, on the base station side, the base station configures the sending resources of the first signal, the second signal and the third signal, wherein the third signal may be used to indicate the transceiving of the second signal.

Optionally, the sending moment of the second signal is indicated by the sending moment of the third signal, wherein the sending moment of the second signal is same as the sending moment of the third signal, or the sending moment of the second signal is before the sending moment of the third signal and has a set time offset from the sending moment of the third signal.

On the terminal side, the terminal receives the sending resources of the first signal, the second signal and the third signal configured by the base station, and receives the corresponding signals according to the sending resources configured by the base station, wherein the terminal determines the sending moment of the second signal according to the sending moment of the third signal, and receives the second signal according to the sending moment of the second signal.

For example, the base station configures whether to send the third signal at the moment M. In a case that the third signal is sent at the moment M, the base station sends the second signal at the moment (M−n), wherein n is a positive integer not less than zero, so that the transceiving of the second signal is not later than the moment of the PF (Paging Frame) where the third signal is located, or the transceiving of the second signal is not later than the moment of the PO (Paging Occasion) where the third signal is located.

In a case that the base station does not send the third signal, the base station does not configure the sending of the second signal.

Implementation 5: The third signal indicates the transceiving of the first signal and the second signal.

In the Implementation 5, on the base station side, the base station configures the sending resources of the first signal, the second signal and the third signal, wherein the third signal may be used to indicate the transceiving of the first signal and the second signal.

Optionally, the sending moments of the first signal and the second signal are indicated by the sending moment of the third signal. In some embodiments, the sending moments of the first signal and the second signal are the same as the sending moment of the third signal. In some other embodiments, the sending moment of the first signal is the same as the sending moment of the second signal, and this sending moment is before the sending moment of the third signal and has a set time offset from the sending moment of the third signal. In some other embodiments, the sending moment of the first signal is before the sending moment of the third signal and has a set time offset from the sending moment of the third signal, and the sending moment of the second signal is the same as the sending moment of the third signal. In some other embodiments, the sending moment of the first signal is before the sending moment of the third signal and has a set first time offset from the sending moment of the third signal, the sending moment of the second signal is before the sending moment of the third signal and has a set second time offset from the sending moment of the third signal, and the first time offset is greater than the second time offset.

On the terminal side, the terminal receives the sending resources of the first signal, the second signal and the third signal configured by the base station, and receives the corresponding signals according to the sending resources configured by the base station, wherein the terminal determines the sending moments of the first signal and the second signal according to the sending moment of the third signal, receives the first signal according to the sending moment of the first signal, and receives the second signal according to the sending moment of the second signal.

For example, the base station configures whether to send the third signal at the moment M. In a case that the third signal is sent at the moment M, the base station sends the first signal at the moment (M−k) and sends the second signal at the moment (M−n), wherein k and n are positive integers not less than zero, n≤k. Since n≤k, the sending moment of the second signal is not earlier than the sending moment of the first signal. Since n≥0, the transceiving of the second signal is not later than the moment of the PF (Paging Frame) where the third signal is located, or the transceiving of the second signal is not later than the moment of the PO (Paging Occasion) where the third signal is located.

In a case that the base station does not send the third signal, the base station does not configure the sending of the first signal and the sending of the second signal.

Implementation 6: The first signal indicates the transceiving of the third signal.

In the Implementation 6, on the base station side, the base station configures the sending resources of the first signal, the second signal and the third signal, wherein the first signal may be used to indicate the transceiving of the third signal.

Optionally, the sending moment of the third signal is indicated by the sending moment of the first signal, wherein the sending moment of the third signal is same as the sending moment of the first signal, or the sending moment of the third signal is after the sending moment of the first signal and has a set time offset from the sending moment of the first signal.

On the terminal side, the terminal receives the sending resources of the first signal, the second signal and the third signal configured by the base station, and receives the corresponding signals according to the sending resources configured by the base station, wherein the terminal determines the sending moment of the third signal according to the sending moment of the first signal, and receives the third signal according to the sending moment of the third signal.

For example, in a case that the base station is configured to send the first signal at the moment N, the base station sends the third signal at the moment (N+x), wherein x is a positive integer not less than zero, so that the transceiving of the third signal is not earlier than the sending moment of the first signal.

Implementation 7: The second signal indicates the transceiving of the third signal.

In the Implementation 7, on the base station side, the base station configures at least the sending resources of the second signal and the third signal, and further, may also configure the sending resources of the first signal, wherein the second signal may be used to indicate the transceiving of the third signal.

Optionally, the sending moment of the third signal is indicated by the sending moment of the second signal, wherein the sending moment of the third signal is same as the sending moment of the second signal, or the sending moment of the third signal is after the sending moment of the second signal and has a set time offset from the sending moment of the second signal.

On the terminal side, the terminal receives the sending resources of the second signal and the third signal configured by the base station. Further, in a case that the base station configures the sending resources of the first signal, the terminal receives the sending resources of the first signal configured by the base station, and receives the corresponding signals according to the sending resources configured by the base station, wherein the terminal determines the sending moment of the third signal according to the sending moment of the second signal, and receives the third signal according to the sending moment of the third signal.

For example, in a case that the base station is configured to send the second signal at the moment P, the base station sends the third signal at the moment (P+y), wherein y is a positive integer not less than zero, so that the transceiving of the third signal is not earlier than the sending moment of the second signal.

Implementation 8: The first signal and the second signal jointly indicate the transceiving of the third signal.

In the Implementation 8, on the base station side, the base station configures the sending resources of the first signal, the second signal and the third signal, wherein the first signal and the second signal may jointly indicate the transceiving of the third signal.

Optionally, the first signal includes at least one of fifth indication information and sixth indication information, the fifth indication information is used to indicate whether terminals in a first terminal group send or receive the second signal, and the sixth indication information is used to indicate sending resources of the second signal to the terminals in the first terminal group. The sending moment of the third signal is indicated by the sending moment of the second signal, wherein the sending moment of the third signal is same as the sending moment of the second signal, or the sending moment of the third signal is after the sending moment of the second signal and has a set time offset from the sending moment of the second signal.

On the terminal side, the terminal receives the sending resources of the first signal, the second signal and the third signal configured by the base station, and receives the corresponding signals according to the sending resources configured by the base station.

Taking a terminal in the first terminal group as an example, the signal receiving operation of the terminal may include the following operations.

In a case that the first signal received by the terminal includes the fifth indication information (and no sixth indication information) and the terminal determines according to the fifth indication information that the terminal needs to receive the second signal, the terminal receives the second signal according to the sending resources of the second signal configured by the base station, determines the sending moment of the third signal according to the sending moment of the second signal, and receives the third signal according to the sending moment of the third signal; in a case that the terminal determines according to the fifth indication information that the terminal does not need to receive the second signal, the terminal does not receive the second signal and the third signal.

In a case that the first signal received by the terminal includes the fifth indication information and the sixth indication information and the terminal determines according to the fifth indication information that the terminal needs to receive the second signal, the terminal receives the second signal according to the sending resources indicated by the sixth indication information, determines the sending moment of the third signal according to the sending moment of the second signal, and receives the third signal according to the sending moment of the third signal; in a case that the terminal determines according to the fifth indication information that the terminal does not need to receive the second signal, the terminal does not receive the second signal and the third signal.

In a case that the first signal received by the terminal includes the sixth indication information (and no fifth indication information), the terminal determines that the terminal needs to receive the second signal, receives the second signal according to the sending resources indicated by the sixth indication information, determines the sending moment of the third signal according to the sending moment of the second signal, and receives the third signal according to the sending moment of the third signal.

For terminals not in the first terminal group, the signal reception can be performed conventionally.

Optionally, in a case that the sending resources of the first signal conflict with the sending resources of the second signal, then: in some embodiments, the base station may send the first signal and forbid sending the second signal; in some other embodiments, the base station may send the first signal and the second signal, wherein at least one resource unit is spaced between the second signal and the first signal, and the resource unit includes at least one of a time domain resource unit, a frequency domain resource unit, a code domain resource unit, or a spatial domain resource unit. The time domain resource unit may include at least one of: radio frame, half frame, subframe, slot, or symbol; the frequency domain resource unit may include at least one of: carrier, RB, or RE; and the spatial domain resource unit may include at least one of: radian, or degree.

For example, in a case that the sending resources of the first signal conflict with the sending resources of the second signal, the base station is configured to send the first signal, and send the second signal at a resource interval of at least one resource unit after the first signal. For another example, in a case that the sending resources of the first signal conflict with the sending resources of the second signal, the base station is configured to send the second signal, and send the first signal at a resource interval of at least one resource unit before the second signal.

It can be seen from the above description that the embodiments of the present application can solve the sending pattern design of the first signal, the second signal and the third signal in the RRC idle state (RRC-idle) or RRC inactive state (RRC-inactive), reduce the additional power consumption caused by different parameter ranges among the three signals through the joint configuration of the signals, and also reduce the unnecessary monitoring of the paging signal (Paging), thereby reducing the power consumption of the terminal.

Based on the same technical concept, an embodiment of the present application further provides a base station, which can implement the functions of the base station side in the above-mentioned embodiments.

Figure 7:
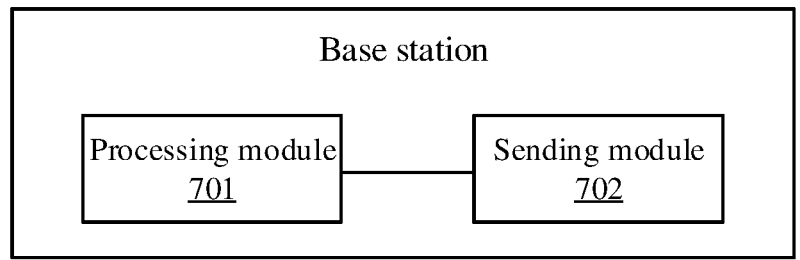
FIG. 7 exemplarily shows a structural schematic diagram of a base station provided by an embodiment of the present application.

FIG. 7 exemplarily shows a structure of the base station in this embodiment of the present application. As shown, the base station may include a processing module 701 and a sending module 702.

The processing module 701 is configured to configure sending resources of at least two of a first signal, a second signal and a third signal, wherein transceiving of one of the at least two signals is indicated by at least one of other signals; the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging. The description of the above-mentioned first signal, second signal and third signal is the same as that in the previous embodiment, and will not be repeated herein.

The sending module 702 is configured to send the at least two signals according to the sending resources of the at least two signals.

Optionally, the processing module 701 is specifically configured to: configure sending resources of the first signal and the second signal, wherein the first signal includes at least one of first indication information and second indication information, the first indication information is used to indicate whether to send or receive the second signal, and the second indication information is used to indicate sending resources of the second signal.

Optionally, the second indication information is a resource index of the sending resources of the second signal; the sending resources of the second signal include at least one of sending resources configured by RRC signaling, pre-agreed sending resources, or sending resources associated with sending resources of the first signal.

Optionally, the sending resources associated with the sending resources of the first signal include one or any combination of: sending resources with a time interval from the sending resources of the first signal in a time domain being not greater than a set time interval, sending resources with a frequency-domain interval from the sending resources of the first signal in a frequency domain being not greater than a set frequency-domain interval, sending resources with a beam interval from the sending resources of the first signal in a spatial beam direction being not greater than a set spatial domain interval, sending resources orthogonal to the sending resources of the first signal in a code domain.

Optionally, the processing module 701 is specifically configured to: configure sending resources of the first signal and the second signal, wherein the second signal includes at least one of third indication information and fourth indication information, the third indication information is used to indicate whether to send or receive the first signal, and the fourth indication information is used to indicate sending resources of the first signal.

Optionally, the fourth indication information is a resource index of the sending resources of the first signal; the sending resources of the first signal include at least one of sending resources configured by RRC signaling, pre-agreed sending resources, or sending resources associated with sending resources of the second signal.

Optionally, the sending resources associated with the sending resources of the second signal include one or any combination of: sending resources with a time interval from the sending resources of the second signal in a time domain being not greater than a set time interval, sending resources with a frequency-domain interval from the sending resources of the second signal in a frequency domain being not greater than a set frequency-domain interval, sending resources with a beam interval from the sending resources of the second signal in a spatial beam direction being not greater than a set spatial domain interval, sending resources orthogonal to the sending resources of the second signal in a code domain Optionally, the processing module 701 is specifically configured to: configure sending resources of the first signal and the third signal, wherein a sending moment of the first signal is indicated by a sending moment of the third signal, wherein the sending moment of the first signal is same as the sending moment of the third signal, or the sending moment of the first signal is before the sending moment of the third signal and has a set time offset from the sending moment of the third signal.

Optionally, the processing module 701 is specifically configured to: configure sending resources of the second signal and the third signal, wherein a sending moment of the second signal is indicated by a sending moment of the third signal, wherein the sending moment of the second signal is same as the sending moment of the third signal, or the sending moment of the second signal is before the sending moment of the third signal and has a set time offset from the sending moment of the third signal.

Optionally, the processing module 701 is specifically configured to: configure sending resources of the first signal, the second signal and the third signal, wherein sending moments of the first signal and the second signal are indicated by a sending moment of the third signal, wherein: the sending moments of the first signal and the second signal are same as the sending moment of the third signal; or the sending moment of the first signal is same as the sending moment of the second signal, and this sending moment is before the sending moment of the third signal and has a set time offset from the sending moment of the third signal; or the sending moment of the first signal is before the sending moment of the third signal and has a set time offset from the sending moment of the third signal, and the sending moment of the second signal is same as the sending moment of the third signal; or the sending moment of the first signal is before the sending moment of the third signal and has a set first time offset from the sending moment of the third signal, the sending moment of the second signal is before the sending moment of the third signal and has a set second time offset from the sending moment of the third signal, and the first time offset is greater than the second time offset.

Optionally, the processing module 701 is specifically configured to: configure sending resources of the first signal and the third signal, wherein a sending moment of the third signal is indicated by a sending moment of the first signal, wherein the sending moment of the third signal is same as the sending moment of the first signal, or the sending moment of the third signal is after the sending moment of the first signal and has a set time offset from the sending moment of the first signal.

Optionally, the processing module 701 is specifically configured to: configure sending resources of the second signal and the third signal, wherein a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal.

Optionally, the processing module 701 is specifically configured to: configure sending resources of the first signal, the second signal and the third signal, wherein: the first signal includes at least one of fifth indication information and sixth indication information, the fifth indication information is used to indicate whether terminals in a first terminal group send or receive the second signal, and the sixth indication information is used to indicate sending resources of the second signal to the terminals in the first terminal group; a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal.

Optionally, the processing module 701 is further configured to: in a case that sending resources of the first signal conflict with sending resources of the second signal, then: send the first signal, and forbid sending the second signal; or send the first signal and the second signal, wherein at least one resource unit is spaced between the second signal and the first signal, and the resource unit includes at least one of a time domain resource unit, a frequency domain resource unit, a code domain resource unit, or a spatial domain resource unit.

Optionally, the first signal includes at least one of: SSB, SSS, PSS, PBCH, or RMSI;

the second signal includes at least one of: TRS, CSI-RS, WUS, PT-RS, or P-RS;

the third signal includes a paging signal.

It should be noted here that the above-mentioned base station provided in this embodiment of the present application can implement all the method steps implemented in the above-mentioned method embodiment and can achieve the same technical effects. The parts and beneficial effects in this embodiment same as those in the method embodiment will not be described herein in detail.

Based on the same technical concept, an embodiment of the present application further provides a terminal, which can implement the above-mentioned functions on the terminal side.

Figure 8:
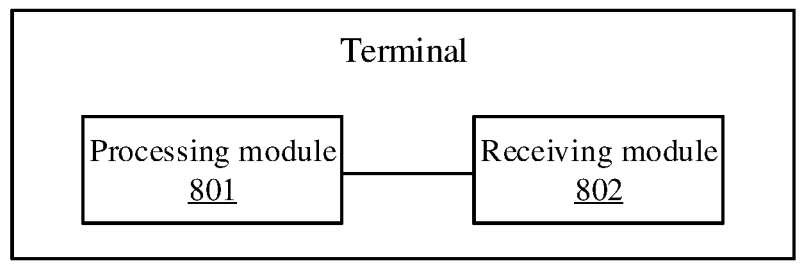
FIG. 8 exemplarily shows a structural schematic diagram of a terminal provided by an embodiment of the present application.

FIG. 8 exemplarily shows a structure of the terminal in this embodiment of the present application. As shown, the terminal may include a processing module 801 and a receiving module 802.

Under the control of the processing module 801, the receiving module 802 is configured to: receive sending resources of at least two of a first signal, a second signal and a third signal configured by a base station, and receive the at least two signals according to the sending resources of the at least two signals, wherein transceiving of one of the at least two signals is indicated by at least one of other signals; the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging. The description of the above-mentioned first signal, second signal and third signal is the same as that in the previous embodiment, and will not be repeated herein.

Optionally, the first signal received by the terminal includes at least one of first indication information and second indication information, the first indication information is used to indicate whether to send or receive the second signal, and the second indication information is used to indicate sending resources of the second signal, then: the receiving module 802 is, under the control of the processing module 801, specifically configured to:
- receive the second signal according to the sending resources of the second signal configured by the base station, in a case that the first signal includes the first indication information and the terminal determines according to the first indication information that the terminal needs to receive the second signal;
- receive the second signal according to the sending resources indicated by the second indication information, in a case that the first signal includes the first indication information and the second indication information and the terminal determines according to the first indication information that the terminal needs to receive the second signal;
- determine that the terminal needs to receive the second signal, and receive the second signal according to the sending resources indicated by the second indication information, in a case that the first signal includes the second indication information.

Optionally, the second indication information is a resource index of the sending resources of the second signal; the sending resources of the second signal include at least one of sending resources configured by RRC signaling, pre-agreed sending resources, or sending resources associated with sending resources of the first signal.

Optionally, the sending resources associated with the sending resources of the first signal include one or any combination of: sending resources with a time interval from the sending resources of the first signal in a time domain being not greater than a set time interval, sending resources with a frequency-domain interval from the sending resources of the first signal in a frequency domain being not greater than a set frequency-domain interval, sending resources with a beam interval from the sending resources of the first signal in a spatial beam direction being not greater than a set spatial domain interval, sending resources orthogonal to the sending resources of the first signal in a code domain.

Optionally, the second signal received by the terminal includes at least one of third indication information and fourth indication information, the third indication information is used to indicate whether to send or receive the first signal, and the fourth indication information is used to indicate sending resources of the first signal, then:
- the receiving module 802 receives the first signal according to the sending resources of the first signal configured by the base station, in a case that the second signal includes the third indication information and the processing module 801 determines according to the third indication information that the first signal needs to be received;
- the receiving module 802 receives the first signal according to the sending resources indicated by the fourth indication information, in a case that the second signal includes the third indication information and the fourth indication information and the processing module 801 determines according to the third indication information that the first signal needs to be received;
- the processing module 801 determines that the first signal needs to be received, and the receiving module 802 receives the first signal according to the sending resources indicated by the fourth indication information, in a case that the second signal includes the fourth indication information.

Optionally, the fourth indication information is a resource index of the sending resources of the first signal; the sending resources of the first signal include at least one of sending resources configured by RRC signaling, pre-agreed sending resources, or sending resources associated with sending resources of the second signal.

Optionally, the sending resources associated with the sending resources of the second signal include one or any combination of: sending resources with a time interval from the sending resources of the second signal in a time domain being not greater than a set time interval, sending resources with a frequency-domain interval from the sending resources of the second signal in a frequency domain being not greater than a set frequency-domain interval, sending resources with a beam interval from the sending resources of the second signal in a spatial beam direction being not greater than a set spatial domain interval, sending resources orthogonal to the sending resources of the second signal in a code domain Optionally, the receiving module 802 receives sending resources of the first signal and the third signal configured by the base station, wherein a sending moment of the first signal is indicated by a sending moment of the third signal, wherein the sending moment of the first signal is same as the sending moment of the third signal, or the sending moment of the first signal is before the sending moment of the third signal and has a set time offset from the sending moment of the third signal; then: the receiving module 802, under the control of the processing module 801, determines the sending moment of the first signal according to the sending moment of the third signal and receives the first signal according to the sending moment of the first signal.

Optionally, the receiving module 802 receives sending resources of the second signal and the third signal configured by the base station, wherein a sending moment of the second signal is indicated by a sending moment of the third signal, wherein the sending moment of the second signal is same as the sending moment of the third signal, or the sending moment of the second signal is before the sending moment of the third signal and has a set time offset from the sending moment of the third signal; then: the receiving module 802, under the control of the processing module 801, determines the sending moment of the second signal according to the sending moment of the third signal and receives the second signal according to the sending moment of the second signal.

Optionally, the receiving module 802 receives sending resources of the first signal, the second signal and the third signal configured by the base station, wherein sending moments of the first signal and the second signal are indicated by a sending moment of the third signal, wherein: the sending moments of the first signal and the second signal are same as the sending moment of the third signal; or the sending moment of the first signal is same as the sending moment of the second signal, and this sending moment is before the sending moment of the third signal and has a set time offset from the sending moment of the third signal; or the sending moment of the first signal is before the sending moment of the third signal and has a set time offset from the sending moment of the third signal, and the sending moment of the second signal is same as the sending moment of the third signal; or the sending moment of the first signal is before the sending moment of the third signal and has a set first time offset from the sending moment of the third signal, the sending moment of the second signal is before the sending moment of the third signal and has a set second time offset from the sending moment of the third signal, and the first time offset is greater than the second time offset; then: the receiving module 802, under the control of the processing module 801, determines the sending moments of the first signal and the second signal according to the sending moment of the third signal, receives the first signal according to the sending moment of the first signal and receives the second signal according to the sending moment of the second signal.

Optionally, the receiving module 802 receives sending resources of the first signal and the third signal configured by the base station, wherein a sending moment of the third signal is indicated by a sending moment of the first signal, wherein the sending moment of the third signal is same as the sending moment of the first signal, or the sending moment of the third signal is after the sending moment of the first signal and has a set time offset from the sending moment of the first signal; then: the receiving module 802, under the control of the processing module 801, determines the sending moment of the third signal according to the sending moment of the first signal and receives the third signal according to the sending moment of the third signal.

Optionally, the receiving module 802 receives sending resources of the second signal and the third signal configured by the base station, wherein a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal; then: the receiving module 802, under the control of the processing module 801, determines the sending moment of the third signal according to the sending moment of the second signal and receives the third signal according to the sending moment of the third signal.

Optionally, the receiving module 802 receives sending resources of the first signal, the second signal and the third signal configured by the base station, wherein:

the first signal includes at least one of fifth indication information and sixth indication information, the fifth indication information is used to indicate whether terminals in a first terminal group send or receive the second signal, and the sixth indication information is used to indicate sending resources of the second signal to the terminals in the first terminal group;

a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal;

then the receiving module 802, under the control of the processing module 801, executes:

receiving the second signal according to the sending resources of the second signal configured by the base station, determining the sending moment of the third signal according to the sending moment of the second signal, and receiving the third signal according to the sending moment of the third signal, in a case that the terminal is a terminal in the first terminal group, the received first signal includes the fifth indication information, and it is determined according to the fifth indication information that the second signal needs to be received;

receiving the second signal according to the sending resources indicated by the sixth indication information, determining the sending moment of the third signal according to the sending moment of the second signal, and receiving the third signal according to the sending moment of the third signal, in a case that the terminal is a terminal in the first terminal group, the received first signal includes the fifth indication information and the sixth indication information, and it is determined according to the fifth indication information that the second signal needs to be received;

determining that the terminal needs to receive the second signal, receiving the second signal according to the sending resources indicated by the sixth indication information, determining the sending moment of the third signal according to the sending moment of the second signal, and receiving the third signal according to the sending moment of the third signal, in a case that the terminal is a terminal in the first terminal group and the received first signal includes the sixth indication information.

Optionally, the first signal includes at least one of: SSB, SSS, PSS, PBCH, or RMSI;

the second signal includes at least one of: TRS, CSI-RS, WUS, PT-RS, or P-RS;

the third signal includes a paging signal.

It should be noted here that the above-mentioned terminal provided in this embodiment of the present application can implement all the method steps implemented in the above-mentioned method embodiment and can achieve the same technical effects. The parts and beneficial effects in this embodiment same as those in the method embodiment will not be described here in detail.

Based on the same technical concept, an embodiment of the present application further provides a base station, which can implement the functions of the base station side in the above-mentioned embodiments.

Figure 9:
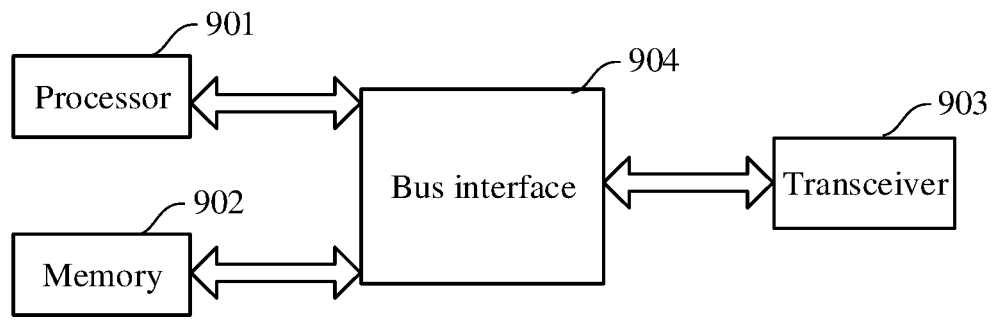
FIG. 9 exemplarily shows a structural schematic diagram of a base station provided by another embodiment of the present application.

FIG. 9 exemplarily shows a structural schematic diagram of the base station in the embodiment of the present application. As shown, the base station may include: a processor 901, a memory 902, a transceiver 903 and a bus interface 904.

The processor 901 is responsible for managing the bus architecture and general processing, and the memory 902 may store the data used by the processor 901 when performing the operations. The transceiver 903 is configured to receive and send the data under the control of the processor 901.

The bus architecture may include any numbers of interconnected buses and bridges, and specifically link various circuits of one or more processors represented by the processor 901 and the memory represented by the memory 902. The bus architecture may further link various other circuits such as peripheral device, voltage regulator and power management circuit, which are all well known in the art and thus will not be further described again herein. The bus interface provides an interface. The processor 901 is responsible for managing the bus architecture and general processing, and the memory 902 may store the data used by the processor 901 when performing the operations.

The procedure disclosed by the embodiment of the present application may be applied in the processor 901 or implemented by the processor 901. In the implementation process, each step of the signal processing flow may be completed by the integrated logic circuit of hardware in the processor 901 or the instruction in the form of software. The processor 901 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 902, and the processor 901 reads the information in the memory 902 and completes the steps of the signal processing flow in combination with its hardware.

Specifically, the processor 901 is configured to read computer instructions in the memory 902 and execute the functions implemented on the base station side in the process shown in FIG. 2.

Specifically, the processor 901 may read the computer instructions in the memory 902 to: configure sending resources of at least two of a first signal, a second signal and a third signal, and send the at least two signals according to the sending resources of the at least two signals, wherein transceiving of one of the at least two signals is indicated by at least one of other signals, wherein the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging. The description of the above-mentioned first signal, second signal and third signal is the same as that in the previous embodiment, and will not be repeated herein.

Optionally, when configuring the sending resources of at least two of the first signal, the second signal and the third signal, wherein transceiving of one of the at least two signals is indicated by at least one of other signals, the processor 901 is specifically configured to:

configure sending resources of the first signal and the second signal, wherein the first signal includes at least one of first indication information and second indication information, the first indication information is used to indicate whether to send or receive the second signal, and the second indication information is used to indicate sending resources of the second signal.

Optionally, the second indication information is a resource index of the sending resources of the second signal; the sending resources of the second signal include at least one of sending resources configured by RRC signaling, pre-agreed sending resources, or sending resources associated with sending resources of the first signal.

Optionally, the sending resources associated with the sending resources of the first signal include one or any combination of:

sending resources with a time interval from the sending resources of the first signal in a time domain being not greater than a set time interval;

sending resources with a frequency-domain interval from the sending resources of the first signal in a frequency domain being not greater than a set frequency-domain interval;

sending resources with a beam interval from the sending resources of the first signal in a spatial beam direction being not greater than a set spatial domain interval;

sending resources orthogonal to the sending resources of the first signal in a code domain Optionally, when configuring the sending resources of at least two of the first signal, the second signal and the third signal, wherein transceiving of one of the at least two signals is indicated by at least one of other signals, the processor 901 is specifically configured to:

configure sending resources of the first signal and the second signal, wherein the second signal includes at least one of third indication information and fourth indication information, the third indication information is used to indicate whether to send or receive the first signal, and the fourth indication information is used to indicate sending resources of the first signal.

Optionally, the fourth indication information is a resource index of the sending resources of the first signal; the sending resources of the first signal include at least one of sending resources configured by RRC signaling, pre-agreed sending resources, or sending resources associated with sending resources of the second signal.

Optionally, the sending resources associated with the sending resources of the second signal include one or any combination of:

sending resources with a time interval from the sending resources of the second signal in a time domain being not greater than a set time interval;

sending resources with a frequency-domain interval from the sending resources of the second signal in a frequency domain being not greater than a set frequency-domain interval;

sending resources with a beam interval from the sending resources of the second signal in a spatial beam direction being not greater than a set spatial domain interval;

sending resources orthogonal to the sending resources of the second signal in a code domain.

Optionally, when configuring the sending resources of at least two of the first signal, the second signal and the third signal, wherein transceiving of one of the at least two signals is indicated by at least one of other signals, the processor 901 is specifically configured to:

configure sending resources of the first signal and the third signal, wherein a sending moment of the first signal is indicated by a sending moment of the third signal, wherein the sending moment of the first signal is same as the sending moment of the third signal, or the sending moment of the first signal is before the sending moment of the third signal and has a set time offset from the sending moment of the third signal.

Optionally, when configuring the sending resources of at least two of the first signal, the second signal and the third signal, wherein transceiving of one of the at least two signals is indicated by at least one of other signals, the processor 901 is specifically configured to:

configure sending resources of the second signal and the third signal, wherein a sending moment of the second signal is indicated by a sending moment of the third signal, wherein the sending moment of the second signal is same as the sending moment of the third signal, or the sending moment of the second signal is before the sending moment of the third signal and has a set time offset from the sending moment of the third signal.

Optionally, when configuring the sending resources of at least two of the first signal, the second signal and the third signal, wherein transceiving of one of the at least two signals is indicated by at least one of other signals, the processor 901 is specifically configured to:

configure sending resources of the first signal, the second signal and the third signal, wherein sending moments of the first signal and the second signal are indicated by a sending moment of the third signal, wherein:

the sending moments of the first signal and the second signal are same as the sending moment of the third signal; or the sending moment of the first signal is same as the sending moment of the second signal, and this sending moment is before the sending moment of the third signal and has a set time offset from the sending moment of the third signal; or the sending moment of the first signal is before the sending moment of the third signal and has a set time offset from the sending moment of the third signal, and the sending moment of the second signal is same as the sending moment of the third signal; or the sending moment of the first signal is before the sending moment of the third signal and has a set first time offset from the sending moment of the third signal, the sending moment of the second signal is before the sending moment of the third signal and has a set second time offset from the sending moment of the third signal, and the first time offset is greater than the second time offset.

Optionally, when configuring the sending resources of at least two of the first signal, the second signal and the third signal, wherein transceiving of one of the at least two signals is indicated by at least one of other signals, the processor 901 is specifically configured to:

configure sending resources of the first signal and the third signal, wherein a sending moment of the third signal is indicated by a sending moment of the first signal, wherein the sending moment of the third signal is same as the sending moment of the first signal, or the sending moment of the third signal is after the sending moment of the first signal and has a set time offset from the sending moment of the first signal.

Optionally, when configuring the sending resources of at least two of the first signal, the second signal and the third signal, wherein transceiving of one of the at least two signals is indicated by at least one of other signals, the processor 901 is specifically configured to:

configure sending resources of the second signal and the third signal, wherein a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal.

Optionally, when configuring the sending resources of at least two of the first signal, the second signal and the third signal, wherein transceiving of one of the at least two signals is indicated by at least one of other signals, the processor 901 is specifically configured to:

configure sending resources of the first signal, the second signal and the third signal, wherein:

the first signal includes at least one of fifth indication information and sixth indication information, the fifth indication information is used to indicate whether terminals in a first terminal group send or receive the second signal, and the sixth indication information is used to indicate sending resources of the second signal to the terminals in the first terminal group;

a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal.

Optionally, in a case that sending resources of the first signal conflict with sending resources of the second signal, then the processor 901 is further configured to:

send the first signal, and forbid sending the second signal; or send the first signal and the second signal, wherein at least one resource unit is spaced between the second signal and the first signal, and the resource unit includes at least one of a time domain resource unit, a frequency domain resource unit, a code domain resource unit, or a spatial domain resource unit.

Optionally, the first signal includes at least one of: SSB, SSS, PSS, PBCH, or RMSI;

the second signal includes at least one of: TRS, CSI-RS, WUS, PT-RS, or P-RS;

the third signal includes a paging signal.

It should be noted here that the above-mentioned base station provided in this embodiment of the invention can implement all the method steps implemented in the above-mentioned method embodiment and can achieve the same technical effects. The parts and beneficial effects in this embodiment same as those in the method embodiment will not be described herein in detail.

Based on the same technical concept, an embodiment of the present application further provides a terminal, which can implement the functions of the terminal side in the above-mentioned embodiments.

Figure 10:
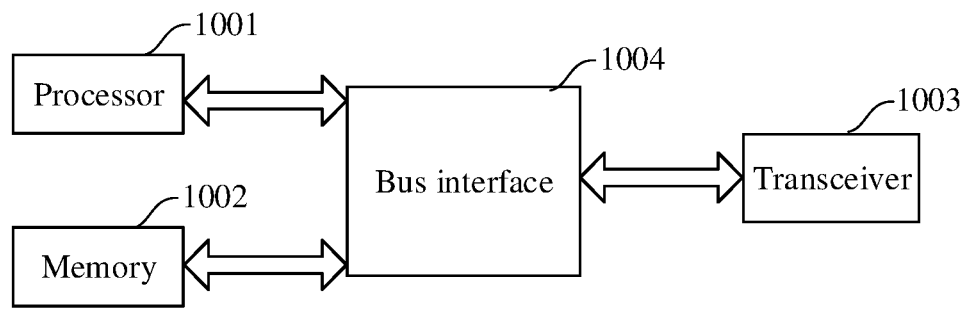
FIG. 10 exemplarily shows a structural schematic diagram of a terminal provided by another embodiment of the present application.

FIG. 10 exemplarily shows a structural schematic diagram of the terminal in the embodiment of the present application. As shown, the terminal may include: a processor 1001, a memory 1002, a transceiver 1003 and a bus interface 1004.

The processor 1001 is responsible for managing the bus architecture and general processing, and the memory 1002 may store the data used by the processor 1001 when performing the operations. The transceiver 1003 is configured to receive and send the data under the control of the processor 1001.

The bus architecture may include any numbers of interconnected buses and bridges, and specifically link various circuits of one or more processors represented by the processor 1001 and the memory represented by the memory 1002. The bus architecture may further link various other circuits such as peripheral device, voltage regulator and power management circuit, which are all well known in the art and thus will not be further described again herein. The bus interface provides an interface. The processor 1001 is responsible for managing the bus architecture and general processing, and the memory 1002 may store the data used by the processor 1001 when performing the operations.

The procedure disclosed by the embodiment of the present application may be applied in the processor 1001 or implemented by the processor 1001. In the implementation process, each step of the signal processing flow may be completed by the integrated logic circuit of hardware in the processor 1001 or the instruction in the form of software. The processor 901 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1002, and the processor 1001 reads the information in the memory 1002 and completes the steps of the signal processing flow in combination with its hardware.

Specifically, the processor 1001 is configured to read computer instructions in the memory 1002 and execute the functions implemented on the terminal side in the process shown in FIG. 3.

Specifically, the processor 1001 may read the computer instructions in the memory 1002 to: receive sending resources of at least two of a first signal, a second signal and a third signal configured by a base station, and receive the at least two signals according to the sending resources of the at least two signals, wherein transceiving of one of the at least two signals is indicated by at least one of other signals, wherein the first signal is a signal for at least one of synchronization, beam measurement, beam acquisition or RRM measurement; the second signal is a signal for at least one of synchronization, fine synchronization, beam measurement, beam acquisition, RRM measurement, CSI measurement or terminal wakeup; and the third signal is a signal for paging. The description of the above-mentioned first signal, second signal and third signal is the same as that in the previous embodiment, and will not be repeated herein.

Optionally, the first signal includes at least one of first indication information and second indication information, the first indication information is used to indicate whether to send or receive the second signal, and the second indication information is used to indicate sending resources of the second signal, then: when receiving the at least two signals according to the sending resources of the at least two signals, the processor 1001 is specifically configured to:

receive the second signal according to the sending resources of the second signal configured by the base station, in a case that the first signal includes the first indication information and it is determined according to the first indication information that the second signal needs to be received;

receive the second signal according to the sending resources indicated by the second indication information, in a case that the first signal includes the first indication information and the second indication information and it is determined according to the first indication information that the second signal needs to be received;

determine that the second signal needs to be received, and receive the second signal according to the sending resources indicated by the second indication information, in a case that the first signal includes the second indication information.

Optionally, the second indication information is a resource index of the sending resources of the second signal; the sending resources of the second signal include at least one of sending resources configured by RRC signaling, pre-agreed sending resources, or sending resources associated with sending resources of the first signal.

Optionally, the sending resources associated with the sending resources of the first signal include one or any combination of:

sending resources with a time interval from the sending resources of the first signal in a time domain being not greater than a set time interval;

sending resources with a frequency-domain interval from the sending resources of the first signal in a frequency domain being not greater than a set frequency-domain interval;

sending resources with a beam interval from the sending resources of the first signal in a spatial beam direction being not greater than a set spatial domain interval;

sending resources orthogonal to the sending resources of the first signal in a code domain Optionally, the second signal includes at least one of third indication information and fourth indication information, the third indication information is used to indicate whether to send or receive the first signal, and the fourth indication information is used to indicate sending resources of the first signal; and the processor 1001 is specifically configured to:

receive the first signal according to the sending resources of the first signal configured by the base station, in a case that the second signal includes the third indication information and it is determined according to the third indication information that the first signal needs to be received;

receive the first signal according to the sending resources indicated by the fourth indication information, in a case that the second signal includes the third indication information and the fourth indication information and it is determined according to the third indication information that the first signal needs to be received;

determine that the first signal needs to be received, and receive the first signal according to the sending resources indicated by the fourth indication information, in a case that the second signal includes the fourth indication information.

Optionally, the fourth indication information is a resource index of the sending resources of the first signal; the sending resources of the first signal include at least one of sending resources configured by RRC signaling, pre-agreed sending resources, or sending resources associated with sending resources of the second signal.

Optionally, the sending resources associated with the sending resources of the second signal include one or any combination of:

sending resources with a time interval from the sending resources of the second signal in a time domain being not greater than a set time interval;

sending resources with a frequency-domain interval from the sending resources of the second signal in a frequency domain being not greater than a set frequency-domain interval;

sending resources with a beam interval from the sending resources of the second signal in a spatial beam direction being not greater than a set spatial domain interval;

sending resources orthogonal to the sending resources of the second signal in a code domain.

Optionally, when receiving the sending resources of at least two of the first signal, the second signal and the third signal configured by the base station, wherein transceiving of one of the at least two signals is indicated by at least one of other signals, the processor 1001 is specifically configured to:

receive sending resources of the first signal and the third signal configured by the base station, wherein a sending moment of the first signal is indicated by a sending moment of the third signal, wherein the sending moment of the first signal is same as the sending moment of the third signal, or the sending moment of the first signal is before the sending moment of the third signal and has a set time offset from the sending moment of the third signal;

when receiving the at least two signals according to the sending resources of the at least two signals, the processor 1001 is specifically configured to:

determine the sending moment of the first signal according to the sending moment of the third signal, and receive the first signal according to the sending moment of the first signal.

Optionally, when receiving the sending resources of at least two of the first signal, the second signal and the third signal configured by the base station, wherein transceiving of one of the at least two signals is indicated by at least one of other signals, the processor 1001 is specifically configured to:

receive sending resources of the second signal and the third signal configured by the base station, wherein a sending moment of the second signal is indicated by a sending moment of the third signal, wherein the sending moment of the second signal is same as the sending moment of the third signal, or the sending moment of the second signal is before the sending moment of the third signal and has a set time offset from the sending moment of the third signal;

when receiving the at least two signals according to the sending resources of the at least two signals, the processor 1001 is specifically configured to:

determine the sending moment of the second signal according to the sending moment of the third signal, and receive the second signal according to the sending moment of the second signal.

Optionally, when receiving the sending resources of at least two of the first signal, the second signal and the third signal configured by the base station, wherein transceiving of one of the at least two signals is indicated by at least one of other signals, the processor 1001 is specifically configured to:

receive sending resources of the first signal, the second signal and the third signal configured by the base station, wherein sending moments of the first signal and the second signal are indicated by a sending moment of the third signal, wherein:

the sending moments of the first signal and the second signal are same as the sending moment of the third signal; or the sending moment of the first signal is same as the sending moment of the second signal, and this sending moment is before the sending moment of the third signal and has a set time offset from the sending moment of the third signal; or the sending moment of the first signal is before the sending moment of the third signal and has a set time offset from the sending moment of the third signal, and the sending moment of the second signal is same as the sending moment of the third signal; or the sending moment of the first signal is before the sending moment of the third signal and has a set first time offset from the sending moment of the third signal, the sending moment of the second signal is before the sending moment of the third signal and has a set second time offset from the sending moment of the third signal, and the first time offset is greater than the second time offset;

when receiving the at least two signals according to the sending resources of the at least two signals, the processor 1001 is specifically configured to:

determine the sending moments of the first signal and the second signal according to the sending moment of the third signal, receive the first signal according to the sending moment of the first signal, and receive the second signal according to the sending moment of the second signal.

Optionally, when receiving the sending resources of at least two of the first signal, the second signal and the third signal configured by the base station, wherein transceiving of one of the at least two signals is indicated by at least one of other signals, the processor 1001 is specifically configured to:

receive sending resources of the first signal and the third signal configured by the base station, wherein a sending moment of the third signal is indicated by a sending moment of the first signal, wherein the sending moment of the third signal is same as the sending moment of the first signal, or the sending moment of the third signal is after the sending moment of the first signal and has a set time offset from the sending moment of the first signal;

when receiving the at least two signals according to the sending resources of the at least two signals, the processor 1001 is specifically configured to:

determine the sending moment of the third signal according to the sending moment of the first signal, and receive the third signal according to the sending moment of the third signal.

Optionally, when receiving the sending resources of at least two of the first signal, the second signal and the third signal configured by the base station, wherein transceiving of one of the at least two signals is indicated by at least one of other signals, the processor 1001 is specifically configured to:

receive sending resources of the second signal and the third signal configured by the base station, wherein a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal;

when receiving the at least two signals according to the sending resources of the at least two signals, the processor 1001 is specifically configured to:

determine the sending moment of the third signal according to the sending moment of the second signal, and receive the third signal according to the sending moment of the third signal.

Optionally, when receiving the sending resources of at least two of the first signal, the second signal and the third signal configured by the base station, wherein transceiving of one of the at least two signals is indicated by at least one of other signals, the processor 1001 is specifically configured to:

receive sending resources of the first signal, the second signal and the third signal configured by the base station, wherein:

the first signal includes at least one of fifth indication information and sixth indication information, the fifth indication information is used to indicate whether terminals in a first terminal group send or receive the second signal, and the sixth indication information is used to indicate sending resources of the second signal to the terminals in the first terminal group;

a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal;

when receiving the at least two signals according to the sending resources of the at least two signals, the processor 1001 is specifically configured to:

receive the second signal according to the sending resources of the second signal configured by the base station, determine the sending moment of the third signal according to the sending moment of the second signal, and receive the third signal according to the sending moment of the third signal, in a case that the terminal is a terminal in the first terminal group, the received first signal includes the fifth indication information, and it is determined according to the fifth indication information that the second signal needs to be received;

receive the second signal according to the sending resources indicated by the sixth indication information, determine the sending moment of the third signal according to the sending moment of the second signal, and receive the third signal according to the sending moment of the third signal, in a case that the terminal is a terminal in the first terminal group, the received first signal includes the fifth indication information and the sixth indication information, and it is determined according to the fifth indication information that the second signal needs to be received;

determine that the terminal needs to receive the second signal, receive the second signal according to the sending resources indicated by the sixth indication information, determine the sending moment of the third signal according to the sending moment of the second signal, and receive the third signal according to the sending moment of the third signal, in a case that the terminal is a terminal in the first terminal group and the received first signal includes the sixth indication information.

Optionally, the first signal includes at least one of: SSB, SSS, PSS, PBCH, or RMSI;

the second signal includes at least one of: TRS, CSI-RS, WUS, PT-RS, or P-RS;

the third signal includes a paging signal.

It should be noted here that the above-mentioned terminal provided in this embodiment of the invention can implement all the method steps implemented in the above-mentioned method embodiment and can achieve the same technical effects. The parts and beneficial effects in this embodiment same as those in the method embodiment will not be described herein in detail.

An embodiment of the present application further provides a computer readable storage medium storing computer executable instructions which are configured to cause a computer to execute the method performed by the base station in the above-mentioned embodiments.

An embodiment of the present application further provides a computer readable storage medium storing computer executable instructions which are configured to cause a computer to execute the method performed by the terminal in the above-mentioned embodiments.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A signal transmission method, comprising:

configuring, by a base station, sending resources of at least two of a first signal, a second signal and a third signal, wherein transceiving of one of the at least two signals is indicated by at least one of other signals; the first signal comprises at least one of: a Synchronization Signal Block, SSB; a Secondary Synchronization Signal, SSS; a Primary Synchronization Signal, PSS; Physical Broadcast Channel, PBCH; Remaining System Information, RMSI; the second signal comprises at least one of: a Tracking Reference Signal, TRS; a Channel State Indicator-Reference Signal, CSI-RS; a Wake-Up Signal, WUS; a Phase Tracking Reference Signal, PT-RS; a Positioning Reference Signal, P-RS; and the third signal is a signal for paging;

sending, by the base station, the at least two signals according to the sending resources of the at least two signals;

wherein the configuring, by the base station, sending resources of at least two of the first signal, the second signal and the third signal, wherein transceiving of one of the at least two signals is indicated by at least one of other signals, comprises one of the following schemes:

scheme 1: configuring, by the base station, sending resources of the first signal and the second signal, wherein the first signal comprises first indication information and second indication information, the first indication information is used to indicate whether to send or receive the second signal, and the second indication information is used to indicate sending resources of the second signal; or scheme 2: configuring, by the base station, sending resources of the first signal and the second signal, wherein the second signal comprises third indication information and fourth indication information, the third indication information is used to indicate whether to send or receive the first signal, and the fourth indication information is used to indicate sending resources of the first signal.

2. The method according to claim 1, wherein in the scheme 1, the second indication information is a resource index of the sending resources of the second signal;

the sending resources of the second signal comprise at least one of sending resources configured by Radio Resource Control, RRC, signaling, pre-agreed sending resources, or sending resources associated with sending resources of the first signal.

3. The method according to claim 2, wherein the sending resources associated with the sending resources of the first signal comprise one or any combination of:

sending resources with a time interval from the sending resources of the first signal in a time domain being not greater than a set time interval;

sending resources with a frequency-domain interval from the sending resources of the first signal in a frequency domain being not greater than a set frequency-domain interval;

sending resources with a beam interval from the sending resources of the first signal in a spatial beam direction being not greater than a set spatial domain interval;

sending resources orthogonal to the sending resources of the first signal in a code domain.

4. The method according to claim 1, wherein in the scheme 2, the fourth indication information is a resource index of the sending resources of the first signal;

the sending resources of the first signal comprise at least one of sending resources configured by RRC signaling, pre-agreed sending resources, or sending resources associated with sending resources of the second signal.

5. The method according to claim 4, wherein the sending resources associated with the sending resources of the second signal comprise one or any combination of:

sending resources with a time interval from the sending resources of the second signal in a time domain being not greater than a set time interval;

sending resources with a frequency-domain interval from the sending resources of the second signal in a frequency domain being not greater than a set frequency-domain interval;

sending resources with a beam interval from the sending resources of the second signal in a spatial beam direction being not greater than a set spatial domain interval;

sending resources orthogonal to the sending resources of the second signal in a code domain.

6. The method according to claim 1, wherein the scheme 1 or scheme 2 is replaced with one of the following schemes:

scheme 3: configuring, by the base station, sending resources of the first signal and the third signal, wherein a sending moment of the first signal is indicated by a sending moment of the third signal, wherein the sending moment of the first signal is same as the sending moment of the third signal, or the sending moment of the first signal is before the sending moment of the third signal and has a set time offset from the sending moment of the third signal;

scheme 4: configuring, by the base station, sending resources of the second signal and the third signal, wherein a sending moment of the second signal is indicated by a sending moment of the third signal, wherein the sending moment of the second signal is same as the sending moment of the third signal, or the sending moment of the second signal is before the sending moment of the third signal and has a set time offset from the sending moment of the third signal;

scheme 5: configuring, by the base station, sending resources of the first signal and the third signal, wherein a sending moment of the third signal is indicated by a sending moment of the first signal, wherein the sending moment of the third signal is same as the sending moment of the first signal, or the sending moment of the third signal is after the sending moment of the first signal and has a set time offset from the sending moment of the first signal; or scheme 6: configuring, by the base station, sending resources of the second signal and the third signal, wherein a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal.

7. The method according to claim 1, wherein the scheme 1 or scheme 2 is replaced with one of the following schemes scheme 7:

configuring, by the base station, sending resources of the first signal, the second signal and the third signal, wherein sending moments of the first signal and the second signal are indicated by a sending moment of the third signal, wherein:

the sending moments of the first signal and the second signal are same as the sending moment of the third signal; or the sending moment of the first signal is same as the sending moment of the second signal, and this sending moment is before the sending moment of the third signal and has a set time offset from the sending moment of the third signal; or the sending moment of the first signal is before the sending moment of the third signal and has a set time offset from the sending moment of the third signal, and the sending moment of the second signal is same as the sending moment of the third signal; or the sending moment of the first signal is before the sending moment of the third signal and has a set first time offset from the sending moment of the third signal, the sending moment of the second signal is before the sending moment of the third signal and has a set second time offset from the sending moment of the third signal, and the first time offset is greater than the second time offset;

scheme 8:

configuring, by the base station, sending resources of the first signal, the second signal and the third signal, wherein:

the first signal comprises at least one of fifth indication information and sixth indication information, the fifth indication information is used to indicate whether terminals in a first terminal group send or receive the second signal, and the sixth indication information is used to indicate sending resources of the second signal to the terminals in the first terminal group;

a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal.

8. A signal transmission method, comprising:

receiving, by a terminal, sending resources of at least two of a first signal, a second signal and a third signal configured by a base station, wherein transceiving of one of the at least two signals is indicated by at least one of other signals; the first signal comprises at least one of: a Synchronization Signal Block, SSB; a Secondary Synchronization Signal, SSS; a Primary Synchronization Signal, PSS; Physical Broadcast Channel, PBCH; Remaining System Information, RMSI; the second signal comprises at least one of: a Tracking Reference Signal, TRS; a Channel State Indicator-Reference Signal, CSI-RS; a Wake-Up Signal, WUS; a Phase Tracking Reference Signal, PT-RS; a Positioning Reference Signal, P-RS; and the third signal is a signal for paging;

receiving, by the terminal, the at least two signals according to the sending resources of the at least two signals; wherein in a case that the first signal received by the terminal comprises first indication information and second indication information, the first indication information is used to indicate whether to send or receive the second signal, and the second indication information is used to indicate sending resources of the second signal;

in a case that the second signal received by the terminal comprises third indication information and fourth indication information, the third indication information is used to indicate whether to send or receive the first signal, and the fourth indication information is used to indicate sending resources of the first signal.

9. The method according to claim 8, wherein the receiving, by the terminal, the at least two signals according to the sending resources of the at least two signals, comprises:

receiving the second signal according to the sending resources indicated by the second indication information, in a case that the first signal comprises the first indication information and the second indication information and the terminal determines according to the first indication information that the terminal needs to receive the second signal.

10. The method according to claim 9, wherein the second indication information is a resource index of the sending resources of the second signal;

the sending resources of the second signal comprise at least one of sending resources configured by Radio Resource Control, RRC, signaling, pre-agreed sending resources, or sending resources associated with sending resources of the first signal.

11. The method according to claim 10, wherein the sending resources associated with the sending resources of the first signal comprise one or any combination of: sending resources with a time interval from the sending resources of the first signal in a time domain being not greater than a set time interval;

sending resources with a frequency-domain interval from the sending resources of the first signal in a frequency domain being not greater than a set frequency-domain interval;

sending resources with a beam interval from the sending resources of the first signal in a spatial beam direction being not greater than a set spatial domain interval;

sending resources orthogonal to the sending resources of the first signal in a code domain.

12. The method according to claim 8, wherein the receiving, by the terminal, the at least two signals according to the sending resources of the at least two signals, comprises:

receiving the first signal according to the sending resources indicated by the fourth indication information, in a case that the second signal comprises the third indication information and the fourth indication information and the terminal determines according to the third indication information that the terminal needs to receive the first signal.

13. The method according to claim 12, wherein the fourth indication information is a resource index of the sending resources of the first signal;

the sending resources of the first signal comprise at least one of sending resources configured by RRC signaling, pre-agreed sending resources, or sending resources associated with sending resources of the second signal.

14. The method according to claim 13, wherein the sending resources associated with the sending resources of the second signal comprise one or any combination of:

sending resources with a time interval from the sending resources of the second signal in a time domain being not greater than a set time interval;

sending resources with a frequency-domain interval from the sending resources of the second signal in a frequency domain being not greater than a set frequency-domain interval;

sending resources with a beam interval from the sending resources of the second signal in a spatial beam direction being not greater than a set spatial domain interval;

sending resources orthogonal to the sending resources of the second signal in a code domain.

15. The method according to claim 8, wherein the receiving, by the terminal, sending resources of at least two of the first signal, the second signal and the third signal configured by the base station, wherein transceiving of one of the at least two signals is indicated by at least one of other signals, comprises:

in a case that the terminal receives sending resources of the first signal and the third signal configured by the base station and a sending moment of the first signal is indicated by a sending moment of the third signal, the sending moment of the first signal is same as the sending moment of the third signal, or the sending moment of the first signal is before the sending moment of the third signal and has a set time offset from the sending moment of the third signal;

the receiving, by the terminal, the at least two signals according to the sending resources of the at least two signals, comprises:

determining, by the terminal, the sending moment of the first signal according to the sending moment of the third signal, and receiving the first signal according to the sending moment of the first signal; or wherein the receiving, by the terminal, sending resources of at least two of the first signal, the second signal and the third signal configured by the base station, wherein transceiving of one of the at least two signals is indicated by at least one of other signals, comprises:

in a case that the terminal receives sending resources of the second signal and the third signal configured by the base station and a sending moment of the second signal is indicated by a sending moment of the third signal, the sending moment of the second signal is same as the sending moment of the third signal, or the sending moment of the second signal is before the sending moment of the third signal and has a set time offset from the sending moment of the third signal;

the receiving, by the terminal, the at least two signals according to the sending resources of the at least two signals, comprises:

determining, by the terminal, the sending moment of the second signal according to the sending moment of the third signal, and receiving the second signal according to the sending moment of the second signal; or wherein the receiving, by the terminal, sending resources of at least two of the first signal, the second signal and the third signal configured by the base station, wherein transceiving of one of the at least two signals is indicated by at least one of other signals, comprises:

in a case that the terminal receives sending resources of the first signal and the third signal configured by the base station and a sending moment of the third signal is indicated by a sending moment of the first signal, the sending moment of the third signal is same as the sending moment of the first signal, or the sending moment of the third signal is after the sending moment of the first signal and has a set time offset from the sending moment of the first signal;

the receiving, by the terminal, the at least two signals according to the sending resources of the at least two signals, comprises:

determining, by the terminal, the sending moment of the third signal according to the sending moment of the first signal, and receiving the third signal according to the sending moment of the third signal; or wherein the receiving, by the terminal, sending resources of at least two of the first signal, the second signal and the third signal configured by the base station, wherein transceiving of one of the at least two signals is indicated by at least one of other signals, comprises:

in a case that the terminal receives sending resources of the second signal and the third signal configured by the base station and a sending moment of the third signal is indicated by a sending moment of the second signal, the sending moment of the third signal is same as the sending moment of the second signal, or the sending moment of the third signal is after the sending moment of the second signal and has a set time offset from the sending moment of the second signal;

the receiving, by the terminal, the at least two signals according to the sending resources of the at least two signals, comprises:

determining, by the terminal, the sending moment of the third signal according to the sending moment of the second signal, and receiving the third signal according to the sending moment of the third signal.

16. The method according to claim 8, wherein the receiving, by the terminal, sending resources of at least two of the first signal, the second signal and the third signal configured by the base station, wherein transceiving of one of the at least two signals is indicated by at least one of other signals, comprises:

in a case that receiving, by the terminal receives sending resources of the first signal, the second signal and the third signal configured by the base station and sending moments of the first signal and the second signal are indicated by a sending moment of the third signal, the sending moments of the first signal and the second signal are same as the sending moment of the third signal; or the sending moment of the first signal is same as the sending moment of the second signal, and this sending moment is before the sending moment of the third signal and has a set time offset from the sending moment of the third signal; or the sending moment of the first signal is before the sending moment of the third signal and has a set time offset from the sending moment of the third signal, and the sending moment of the second signal is same as the sending moment of the third signal; or the sending moment of the first signal is before the sending moment of the third signal and has a set first time offset from the sending moment of the third signal, the sending moment of the second signal is before the sending moment of the third signal and has a set second time offset from the sending moment of the third signal, and the first time offset is greater than the second time offset;

the receiving, by the terminal, the at least two signals according to the sending resources of the at least two signals, comprises:

determining, by the terminal, the sending moments of the first signal and the second signal according to the sending moment of the third signal, receiving the first signal according to the sending moment of the first signal, and receiving the second signal according to the sending moment of the second signal.

17. The method according to claim 8, wherein the receiving, by the terminal, sending resources of at least two of the first signal, the second signal and the third signal configured by the base station, wherein transceiving of one of the at least two signals is indicated by at least one of other signals, comprises:

in a case that the terminal, receives sending resources of the first signal, the second signal and the third signal configured by the base station, the first signal comprises at least one of fifth indication information and sixth indication information, the fifth indication information is used to indicate whether terminals in a first terminal group send or receive the second signal, and the sixth indication information is used to indicate sending resources of the second signal to the terminals in the first terminal group;

a sending moment of the third signal is indicated by a sending moment of the second signal, wherein the sending moment of the third signal is same as the sending moment of the second signal, or the sending moment of the third signal is after the sending moment of the second signal and has a set time offset from the sending moment of the second signal;

the receiving, by the terminal, the at least two signals according to the sending resources of the at least two signals, comprises:

receiving the second signal according to the sending resources of the second signal configured by the base station, determining the sending moment of the third signal according to the sending moment of the second signal, and receiving the third signal according to the sending moment of the third signal, in a case that the terminal is a terminal in the first terminal group, the received first signal comprises the fifth indication information, and it is determined according to the fifth indication information that the second signal needs to be received;

receiving the second signal according to the sending resources indicated by the sixth indication information, determining the sending moment of the third signal according to the sending moment of the second signal, and receiving the third signal according to the sending moment of the third signal, in a case that the terminal is a terminal in the first terminal group, the received first signal comprises the fifth indication information and the sixth indication information, and it is determined according to the fifth indication information that the second signal needs to be received;

determining, by the terminal, that the terminal needs to receive the second signal, receiving the second signal according to the sending resources indicated by the sixth indication information, determining the sending moment of the third signal according to the sending moment of the second signal, and receiving the third signal according to the sending moment of the third signal, in a case that the terminal is a terminal in the first terminal group and the received first signal comprises the sixth indication information.

18. A base station, comprising: a processor, a memory and a transceiver;
   the transceiver is configured to receive and send data under control of the processor;
   the memory is configured to store computer instructions;
   the processor is configured to read the computer instructions to perform the method of claim 1.

19. A terminal, comprising: a processor, a memory and a transceiver;
   the transceiver is configured to receive and send data under control of the processor;
   the memory is configured to store computer instructions;
   the processor is configured to read the computer instructions to:
   receive sending resources of at least two of a first signal, a second signal and a third signal configured by a base station, wherein transceiving of one of the at least two signals is indicated by at least one of other signals; the first signal comprises at least one of: a Synchronization Signal Block, SSB; a Secondary Synchronization Signal, SSS; a Primary Synchronization Signal, PSS; Physical Broadcast Channel, PBCH; Remaining System Information, RMSI; the second signal comprises at least one of: a Tracking Reference Signal, TRS; a Channel State Indicator-Reference Signal, CSI-RS; a Wake-Up Signal, WUS; a Phase Tracking Reference Signal, PT-RS; a Positioning Reference Signal, P-RS; and the third signal is a signal for paging;
   receive the at least two signals according to the sending resources of the at least two signals; wherein
   in a case that the first signal received by the terminal comprises first indication information and second indication information, the first indication information is used to indicate whether to send or receive the second signal, and the second indication information is used to indicate sending resources of the second signal;
   in a case that the second signal received by the terminal comprises third indication information and fourth indication information, the third indication information is used to indicate whether to send or receive the first signal, and the fourth indication information is used to indicate sending resources of the first signal.

* * * * *